United States Patent [19]

Alferness

[11] Patent Number: 4,711,515

[45] Date of Patent: Dec. 8, 1987

[54] ELECTROOPTIC POLARIZATION MULTIPLEXER/DEMULTIPLEXER

[75] Inventor: Rodney C. Alferness, Holmdel, N.J.

[73] Assignee: American Telephone and Telegraph Company, AT&T Bell Laboratories, Murray Hill, N.J.

[21] Appl. No.: 614,528

[22] Filed: May 29, 1984

[51] Int. Cl.[4] .............................................. G02B 6/10
[52] U.S. Cl. ................................ 350/96.14; 350/96.13
[58] Field of Search ............... 350/96.11, 96.12, 96.13, 350/96.14

[56] References Cited

U.S. PATENT DOCUMENTS

| 4,243,295 | 1/1981 | Alferness | 350/96.14 |
| 4,262,993 | 4/1981 | Burns et al. | 350/96.14 |
| 4,390,236 | 9/1983 | Alferness | 350/96.14 |

OTHER PUBLICATIONS

"Switched Directional Couplers . . .", by H. Kogelnik, et al., pp. 396–401, *IEEE J. Quantum Elec.*, vol. QE-12 (1976).

"Precise Determination of Refractive-Index . . .", by Minakata, et al., pp. 4677–4682, *J. Apl. Phys.*, 49(9), Sep. 1978.

"LiNbO$_3$Coupled-Waveguided . . .", by Mikami, pp. 491–493, *Appl. Phys. Lett.*, 36(7), Apr. (1980).

"Guided-Wave Devices for . . .", by Alferness, pp. 946–959, *IEEE J. quant. Elec.*, vol. QE-17 (1981).

"Efficient Optical Waveguide . . .", by Schmidt, pp. 45–47, *Optical Society of America*, (1978).

*Primary Examiner*—John Lee
*Assistant Examiner*—Frank González
*Attorney, Agent, or Firm*—Gregory C. Ranieri

[57] ABSTRACT

An electrooptic polarization multiplexer/demultiplexer incorporates an electrooptic, directional coupler switch structure. The multiplexer/demultiplexer includes a substrate of birefringent, electrooptic material, a pair of phase matched, dielectric waveguides embedded in the substrate and spaced closely together over a distance L (the coupler or device length), a buffer layer of insulating material positioned over the substrate and the pair of electrodes, and a plurality of metallic electrodes positioned on the buffer layer in the vicinity of the waveguides. Electrodes are arranged in a multi-section, reversed $\Delta\beta$ configuration. The distance L is selected such that $1 \leq L/1_{TE} \leq 2$ and $L/1_{TM} \leq 0.5$, where $1_{TE}$ and $1_{TM}$ are transfer lengths for the TE and TM modes, respectively.

8 Claims, 3 Drawing Figures

ELECTROOPTIC POLARIZATION MULTIPLEXER/DEMULTIPLEXER

TECHNICAL FIELD

This invention relates to electrooptic devices and, in particular, to polarization multiplexers and demultiplexers.

BACKGROUND OF THE INVENTION

Polarization multiplexers and demultiplexers are capable of providing a variety of functions in lightwave telecommunications and signal processing systems. These devices permit signal combining and signal splitting or signal tapping for feedback controlled polarization stabilization or even simply signal polarization for fiber gyroscopic applications.

Passive polarization multiplexers and demultiplexers have been demonstrated using dielectric waveguides which intersect or form a Y branch. See, for example, M. Masuda et al., *Appl. Phys. Lett.*, Vol. 37, pp. 20–22 (1980) and H. Nakajima et al., *IEEE Trans. MTT*, MTT-30, pp. 617–621 (1982). On the other hand, a more interesting and versatile class of these devices includes active polarization multiplexers and demultiplexers. See, for example, U. S. Pat. No. 4,390,236 issued to R. C. Alferness on June 28, 1983 and O. Mikami, *Appl. Phys. Lett.*, Vol. 36, pp. 491-3 (1980).

Active polarization multiplexers and demultiplexers utilize dielectric waveguides in the electrooptic directional coupler architecture. Electrodes directly over or adjacent to the waveguides control switching of the directional coupler for either the straight-through state or the crossover state. Parameters of the directional coupler are varied in order to allow the device to respond properly to particular polarizations of input optical signals, that is, the transverse electric (TE) mode or the transverse magnetic (TM) mode. Both of the active devices cited above incorporate phase mismatching of the waveguides for one of the propagating polarizations. Phase mismatch results from additional processing during device fabrication as described below.

For the device shown in the Mikami article cited above, a single metallic electrode is in direct contact with one waveguide while a split metallic electrode is separated from the other waveguide by an intermediate buffer layer. This device utilizes metallic loading of one waveguide to reduce the propagation constant. Unfortunately, metallic loading of a waveguide simultaneously increases the attenuation constant of the TM mode in the metallically loaded waveguide. As a result of the metallic loading, which is essential for polarization selectivity, low propagation loss for the device is possible only when the input light signal is incident on the waveguide which is buffered from the metallic electrode. Therefore, this device is not suitable for polarization-independent applications which require that both polarizations (TE and TM) be coupled into each waveguide.

The polarization selective coupler described in the Alferness patent (his FIG. 2) incorporates the directional coupler architecture mentioned above. However, an intermediate buffer layer is situated between the set of electrodes and the waveguides. Also, Alferness changes the extraordinary refractive index of only one waveguide with respect to the other guide by employing special waveguide fabrication techniques This, in turn, causes the difference in phase propagation constants for one polarization (TM in z-cut lithium niobate) to be significantly greater than zero, while the difference in propagation constants for the other polarization (TE in z-cut lithium niobate) remains essentially zero. Although this coupler permits optical signals of each polarization to be introduced into either waveguide without any of the deleterious effects presented by the device of Mikami, it should be noted that the multiple step waveguide fabrication procedure adds a significant degree of complexity to the overall device fabrication procedure.

SUMMARY OF THE INVENTION

Polarization multiplexing and demultiplexing are achieved, in accordance with the principles of this invention, by an electrooptic device exhibiting a directional coupler architecture including phase matched dielectric waveguides separated from reversed $\Delta\beta$, metallic electrodes by an intermediate buffer layer. In this electrooptic device, the device length, L, normalized to the transfer length for one polarization ($1_{TM}$) is significantly different from the device length normalized to the transfer length for the orthogonal polarization ($1_{TE}$).

In one particular embodiment of the invention, the device length normalized to the TM transfer length is less than ½ and the device length normalized to the TE transfer length is between 1 and 2, inclusive.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
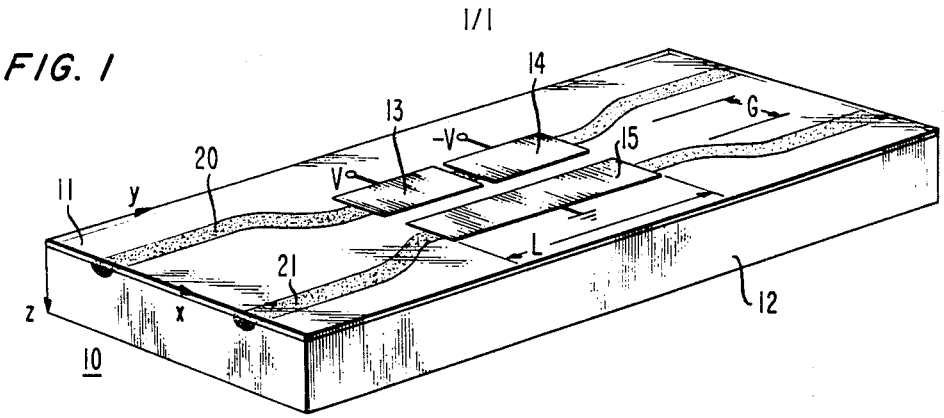
FIG. 1 is a polarization multiplexer/demultiplexer in accordance with the principles of this invention.

FIG. 1 is a polarization multiplexer/demultiplexer in accordance with the principles of the invention. Polarization multiplexer/demultiplexer 10 is configured as a directional coupler having two-section, reversed $\Delta\beta$ electrodes 13, 14 and 15 controlling dielectric waveguides 20 and 21. Dielectric waveguides 20 and 21 are embedded in a birefringent, electrooptic substrate 12. Also, waveguides 20 and 21 are separated from electrodes 13, 14 and 15 by an intermediate buffer layer 11 of insulating material.

Dielectric waveguides 20 and 21 are in coupling relationship over a distance L which is referred to as the device length. The waveguides are fabricated in substantially identical manner so that they exhibit the same propagation constants for each direction of signal polarization. That is, $\beta_{TE(20)}$ is approximately equal to $\beta_{TE(21)}$ and $\beta_{TM(20)}$ is approximately equal to $\beta_{TM(21)}$. Additionally, waveguides 20 and 21 are designed to have unequal coupling coefficients for the two orthogonal polarizations, that is, $k_{TE}/k_{TM}$.

Unequal coupling coefficients for both orthogonal polarizations occur when the interwaveguide separation, G, and the dopant diffusion parameters related to waveguide fabrication are judiciously selected to cause the transfer length for the TE mode, $l_{TE}$, to be less than the transfer length for the TM mode, $l_{TM}$. Dopant diffusion parameters of primary interest include indiffused dopant concentration, dopant layer thickness prior to diffusion, diffusion time, and diffusion temperature. For a lithium niobate or lithium tantalate substrate, titanium is a typical dopant employed in fabricating the dielectric waveguides. Methods for fabricating dielectric waveguide structures in birefringent, electrooptic material are well known in the art and can be found in U. S. Pat. No. 4,400,052 issued to R. C. Alferness et al. on Aug. 23, 1983 and the art of record therein, as well as in M. Minakata et al., *J. Appl. Phys.*, Vol. 49, pp. 4677–4682 (1978).

In order to fabricate dielectric waveguides 20 and 21 which are suitable for the practice of this invention, it is important to choose a dopant concentration which causes the waveguide-substrate refractive index difference for the TM mode, $\Delta n_{TM}$, to be larger than the corresponding index difference for the TE mode $\Delta n_{TE}$, where $$\Delta n_{TM} = (n_{TM(20,21)} - n_{TM(12)}),$$

$$\Delta n_{TE} = (n_{TE(21,21)} - n_{TE(12)}),$$

$n_{TM(12)}$ and $n_{TE(12)}$ are the refractive indices of substrate 12 with respect to the particular polarization and $n_{TM(20,21)}$ and $n_{TE(20,21)}$ are the refractive indices for waveguide 20 or 21 with respect to the particular polarization. It should be apparent to those skilled in the art that dopant concentration affects the extraordinary and ordinary indices of refraction for the waveguides as well as the wavelength at which guiding occurs in these waveguides. Also, orientation of the substrate crystal determines whether the relevant refractive index for the TM mode is the extraordinary or ordinary index and whether the relevant refractive index for the TE mode is the ordinary or extraordinary index.

In principle, by making $\Delta n_{TM} - \Delta n_{TE}$ sufficiently large ($l_{TM} - l_{TE}$ is also large), judicious choice of the coupler length L would allow $L/l_{TE}$ to be approximately unity and $L/l_{TM}$ to be approximately zero. As such and without any voltage applied to the electrodes, the TE mode would cross over from one waveguide to the other ("crossover" state) and the TM mode would stay in the same waveguide upon which the signal was incident ("straight-through" state). This is readily understood from an inspection of the following equation defining crossover efficiency $\eta$ as $$\eta = \sin(2\pi/2) \cdot (L/l).$$

However, the switching condition above is difficult to achieve in practice.

Figure 2:
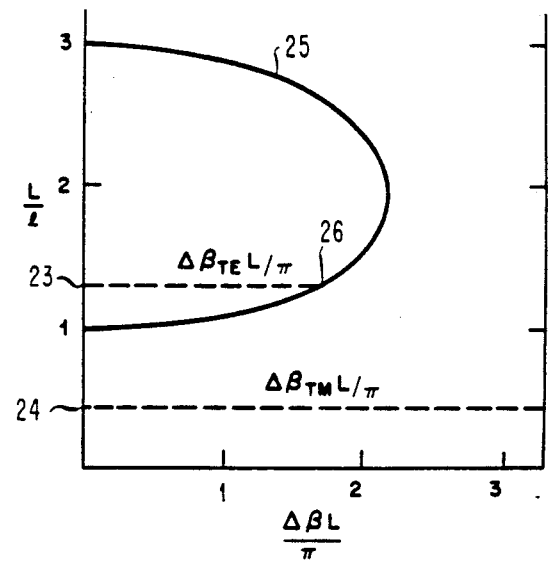
FIG. 2 is a cross-bar switching diagram for two-section, reversed $\Delta\beta$ electrodes as in the device shown in FIG. 1.

Instead, by relying upon the ability of the reversed $\Delta\beta$ electrodes to vary and control electrically the difference in propagation constants for each polarization (mode) via the electrooptic coefficients for the TE and TM modes, it is possible to achieve a more practical solution. For a better understanding of reversed $\Delta\beta$ electrodes and of cross bar diagrams such as the one shown in FIG. 2, see H. Kogelnik et al., *IEEE J. of Quantum Elect.*, Vol. QE-12, No. 7, pp. 396–401 (1976) and R. Schmidt et al., *Optics Letters*, Vol. 2, No. 2, pp. 45–7 (1978). Simply, and in accordance with the present invention, the coupler length normalized to the transfer length for the TE mode is required to be in the range, $1 \leq L/l_{TE} \leq 2$ and the coupler length normalized to the transfer length for the TM mode is chosen to be small, preferably, $L/l_{TM} \leq 0.5$. In the absence of applied voltage from electrodes 13, 14 and 15, the latter conditions on $L/l_{TE}$ (FIG. 2, point 23) and $L/l_{TM}$ (FIG. 2, point 24) do not ensure good polarization selective coupling for either mode as depicted in FIG. 2. However, by applying a sufficient potential via the reversed $\Delta\beta$ electrodes, all TE polarized optical signals crossover to the adjacent waveguide. This is seen from FIG. 2 where point 26 of operating characteristic line ($\Delta\beta_{TE}L$ /lies on curve 26 which is the locus of points ($\Delta\beta\pi/\pi$), L/1) for which there is energy crossover from one waveguide to another. Simultaneously, because $L/l_{TM} < 1.0$, the voltage induced mismatch between the dielectric waveguides, even for the reversed $\Delta\beta$ electrode configuration, significantly reduces the crossover efficiency for the orthogonal polarization, the TM mode. See operating characteristic line ($\Delta\beta_{TM}L/\pi$ in FIG. 2.

The requirements on $L/l_{TE}$ and $L/l_{TM}$ are achieved by making $\Delta n_{TM} - \Delta n_{TE}$ greater than zero in accordance with diffusion techniques described in the Minakata et al. reference cited above.

For these design and operating conditions, the electrooptic coefficient for the TM mode ($r_{33}$) is approximately three times larger than the electrooptic coefficient for the TE mode ($r_{13}$)—a condition which contributes heavily to reduced crossover efficiency for the TM mode. As a result, the polarization multiplexer/demultiplexer shown in FIG. 1 and characterized in FIG. 2 is electrooptically controllable to cause both the TE mode to crossover to the adjacent waveguide (e. g., from waveguide 20 to waveguide 21) and, simultaneously, the TM mode to propagate straight through the waveguide upon which the polarized signals were incident (e. g., waveguide 20).

In one example from experimental practice, waveguides for the polarization multiplexer/demultiplexer shown in FIG. 1 are made by diffusing titanium strips into z-cut, y-propagating lithium niobate. Diffusion of 6 $\mu$m wide, 800 angstrom thick titanium strips is carried out at approximately 1025 degrees Centigrade for about 6 hours. The coupler length 1 is approximately 9.0 mm while the interwaveguide separation G is about 8.5 $\mu$. A buffer layer of silicon dioxide is deposited over the substrate and waveguides. Metallic electrodes are formed from a chromium aluminum alloy over or adjacent to the waveguides. For this device, crossover efficiency in the absence of an applied voltage is approximately 88% for the TE mode (where $L/l_{TE}$ is 1.23) and approximately 44% for the TM mode (where $L/l_{TM}$ is 0.46).

Figure 3:
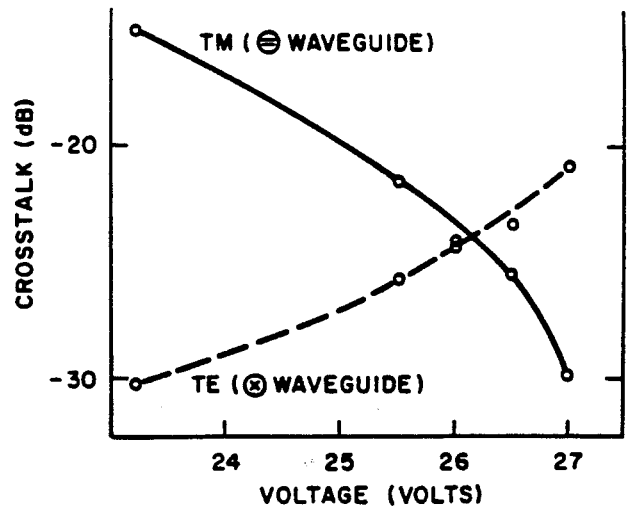
FIG. 3 shows measured crosstalk for each polarization versus applied voltage for an exemplary device shown in FIG. 1.

FIG. 3 shows the measured crosstalk for the device described above for each mode versus voltage applied via the reversed $\Delta\beta$ electrodes. Crosstalk for the TE mode (dashed curve) measured from the output port of the crossover waveguide (e. g., if the TE mode crosses over from waveguide 20 to 21, then the crossover waveguide is waveguide 21 and the straight-through waveguide is waveguide 20) is defined as $(P_\otimes)_{TM}/[(P_\otimes)_{TM} + (P_\otimes)_{TE}]$ where $P_\otimes$ is the light intensity for the crossover waveguide. Crosstalk for the TM mode (solid curve) measured from the output of the straight-through waveguide is defined as $(P_\ominus)_{TE}/[(P_\ominus)_{TE} + (P_\ominus)_{TM}]$ where $P_\ominus$ is the light intensity for the straight through waveguide. As shown in FIG. 3, by appropriate applied voltages on the reversed Δβ electrodes, either the TE mode or the TM mode is individually selectable at the output ports of the crossover and straight-through waveguides, respectively, with measured crosstalk of approximately −30.0 dB. The corresponding measured crosstalk for the orthogonal polarization delivered to the other output port of the other waveguide is −15.0 dB. or −21.0 dB. By adjusting the voltage applied to electrodes 13, 14 and 15, it is possible to extract simultaneously both modes with measured crosstalk below −24.0 dB in each case.

Throughout the description above, there has been no attempt to discriminate between the operation of the device in a multiplexing capacity or in a demultiplexing capacity. It should be clear to those skilled in the art an optical signal introduced into waveguide 20 can be demultiplexed so that the TE mode signal component can exit from the output port of waveguide 21 and the TM mode signal component can exit from the output port of waveguide 21. For multiplexing, the reverse of the example holds true. That is, a TE mode signal component propagating down one waveguide can be multiplexed with a TM mode signal component propagating down the other waveguide. This type of polarization multiplexing is described in the Alferness patent cited above.

It should be clear to those skilled in the art that these and other modifications can be made to the embodiment of the invention described hereinabove without departing from the spirit and scope of the invention. While the waveguides are shown to be side by side there is nothing to prohibit the use of waveguides which are disposed one above the other in a vertical arrangement. Also, with respect to the electrodes, multi-section, reversed Δβ electrodes can be employed in standard configurations as shown in the previously cited articles by Kogelnik et al. and Schmidt et al. Nonstandard multi-section, reversed Δβ electrodes are shown in the Alferness patent cited above.

What is claimed is:

1. A polarization sensitive switching device including
   a substrate of birefringent, electrooptic material,
   a first and second dielectric waveguide embedded in said substrate and closely spaced together over a distance L,
   at least first and second metallic electrodes, said first and second electrode extending for said distance L in the vicinity of said first and second waveguides, respectively, said second electrode including at least first and second portions electrically disconnected from each other and having respective lengths substantially equal to L/2, and
   a buffer layer of insulating material intermediate to the electrodes and both the substrate and waveguides, the device characterized in that
   the first and second waveguides are substantially phase matched to each other for similarly polarized modes of an input optical signal, and
   said distance L is such that $1 \leq L/l_{TE} \leq 2$ and $L/l_{TM} \leq 0.5$, where $l_{TE}$ and $l_{TM}$ are transfer lengths for the TE and TM modes, respectively.

2. The device defined in claim 1 further characterized in that the difference for propagation constants of the first and second waveguides is substantially equal to zero for each polarization of the input optical signal.

3. A polarization sensitive switching device including
   a substrate of birefringent, electrooptic material,
   a first and second dielectric waveguide embedded in said substrate and closely spaced together over a distance L,
   at least first and second metallic electrodes, said first and second electrode extending for said distance L in the vicinity of said first and second waveguides, respectively, said second electrode including at least first and second portions being electrically disconnected from each other and having respective lengths substantially equal to L/2, and
   a buffer layer of insulating material intermediate to the electrodes and both the substrate and waveguides, the device characterized in that
   the first and second waveguides are substantially phase matched to each other for similar polarizations of an input optical signal, and
   said distance L is such that $L/l_{TE} \geq 1$ and $L/l_{TM} \leq L/l_{TE}/2$, where $l_{TE}$ and $l_{TM}$ are transfer lengths for the TE and TM modes, respectively.

4. The device defined in claim 3 further characterized in that the difference for propagation constants of the first and second waveguides is substantially equal to zero for each polarization of the input optical signal.

5. An electrooptic device including
   a directional coupler switch having a substrate of birefringent material, a pair of dielectric waveguides embedded in said substrate and spaced closely together over a distance L, a buffer layer positioned over said substrate and said pair of electrodes, and a plurality of electrodes positioned on the buffer layer in the vicinity of said waveguides, said electrodes being arranged in at least a two-section, reversed Δβ configuration, the device being characterized in that,
   the pair of waveguides are substantially phase matched to each other for similar polarizations of an input optical signal, and
   said distance L is such that $L/l_{TE} \geq 1$ and $L/l_{TM} \leq L/l_{TE}/2$, where $l_{TE}$ and $l_{TM}$ are transfer lengths for the TE and TM modes, respectively.

6. The device defined in claim 5 further characterized in that the difference for propagation constants of the pair of waveguides is substantially equal to zero for each polarization of the input optical signal.

7. An electrooptic device including
   a directional coupler switch having a substrate of birefringent material, a pair of dielectric waveguides embedded in said substrate and spaced closely together over a distance L, a buffer layer positioned over said substrate and said pair of electrodes, and a plurality of electrodes positioned on the buffer layer in the vicinity of said waveguides, said electrodes being arranged in at least a two-section, reversed Δβ configuration, the device being characterized in that,
   the pair of waveguides are substantially phase matched to each other for similar polarizations of an input optical signal, and
   said distance L is such that $1 \leq L/l_{TE} \leq 2$ and $L/l_{TM} \leq 0.5$, where $l_{TE}$ and $l_{TM}$ are transfer lengths for the TE and TM modes, respectively.

8. The device defined in claim 7 further characterized in that the difference for propagation constants of the pair of waveguides is substantially equal to zero for each polarization of the input optical signal.

* * * * *